(12) United States Patent
Vana

(10) Patent No.: US 10,896,013 B2
(45) Date of Patent: Jan. 19, 2021

(54) PRINTING DEVICE POOL

(71) Applicant: Hewlett-Packard Development Company, L.P., Houston, TX (US)

(72) Inventor: Alin Vana, Duebendorf (CH)

(73) Assignee: Hewlett-Packard Development Company, L.P., Spring, TX (US)

( * ) Notice: Subject to any disclaimer, the term of this patent is extended or adjusted under 35 U.S.C. 154(b) by 238 days.

(21) Appl. No.: 16/095,752

(22) PCT Filed: Jul. 6, 2016

(86) PCT No.: PCT/US2016/041061
§ 371 (c)(1),
(2) Date: Oct. 23, 2018

(87) PCT Pub. No.: WO2018/009176
PCT Pub. Date: Jan. 11, 2018

(65) Prior Publication Data
US 2020/0333988 A1    Oct. 22, 2020

(51) Int. Cl.
*G06F 3/12* (2006.01)
*G06Q 20/14* (2012.01)

(52) U.S. Cl.
CPC ............. *G06F 3/126* (2013.01); *G06F 3/1204* (2013.01); *G06F 3/1239* (2013.01); *G06F 3/1271* (2013.01); *G06F 3/1288* (2013.01); *G06Q 20/145* (2013.01)

(58) Field of Classification Search
CPC ...... G06F 3/126; G06F 3/1204; G06F 3/1239; G06F 3/1271; G06F 3/1288; G06Q 20/145

USPC ........................................................ 358/1.15
See application file for complete search history.

(56) References Cited

U.S. PATENT DOCUMENTS

| | | |
|---|---|---|
| 8,045,199 B2 | 10/2011 | Oak |
| 8,806,013 B2 | 8/2014 | Thero et al. |
| 8,947,696 B1 | 2/2015 | Uyttendaele |
| 9,329,807 B2 | 5/2016 | Hertling |
| 2003/0218770 A1 | 11/2003 | Field |
| 2004/0001217 A1 | 1/2004 | Wu |
| 2004/0196491 A1 | 10/2004 | Uchino |
| 2005/0177739 A1* | 8/2005 | Ferlitsch ............ H04N 1/32101 713/189 |
| 2008/0079986 A1 | 4/2008 | Ferlitsch |
| 2010/0309510 A1* | 12/2010 | Hansen ................. G06F 3/1288 358/1.15 |

(Continued)

OTHER PUBLICATIONS

How Does Google Cloud Print Work?, https://www.google.com/cloudprint/learn/howitworks.html ~ May 27, 2016 ~ 3 pages.

(Continued)

*Primary Examiner* — Allen H Nguyen
(74) *Attorney, Agent, or Firm* — HP Inc. Patent Department

(57) ABSTRACT

Examples disclosed herein relate to identifying a pool of printing devices, wherein each of the printing devices is associated with one of a plurality of owner entities, receiving a print job from a user, selecting a printing device from the pool of printing devices for the print job, causing the print job to be printed by the selected printing device, and crediting an account of the owner entity associated with the selected printing device.

19 Claims, 3 Drawing Sheets

(56) References Cited

U.S. PATENT DOCUMENTS

| | | | |
|---|---|---|---|
| 2011/0220711 A1* | 9/2011 | Hendley | G06F 3/1259 |
| | | | 235/375 |
| 2012/0113458 A1 | 5/2012 | Benedek | |
| 2012/0307291 A1* | 12/2012 | Blanchard, Jr. | G06F 3/1254 |
| | | | 358/1.15 |
| 2014/0002845 A1 | 1/2014 | Gutnik et al. | |
| 2014/0285831 A1 | 9/2014 | Liu et al. | |
| 2015/0244890 A1* | 8/2015 | Ciocarlie | G06F 3/124 |
| | | | 358/1.15 |
| 2015/0363140 A1* | 12/2015 | Koutrika | G06Q 30/0255 |
| | | | 358/1.15 |
| 2016/0034232 A1* | 2/2016 | Bhatia | G06Q 20/123 |
| | | | 358/1.14 |
| 2017/0068577 A1* | 3/2017 | Ashokan | G06Q 20/145 |
| 2017/0230536 A1* | 8/2017 | Haapanen | H04N 1/4413 |

OTHER PUBLICATIONS

IOS Printing (iPad & iPhone), < http://www.papercut.com/products/~ May 27, 2016~17 pages.

\* cited by examiner

PRINTING DEVICE POOL

BACKGROUND

Users often desire to print documents at a printing device. Typically, a print job is sent from a user's device, such as a personal computer, to a printing device connected directly to the computer or sharing a same local network. A print driver on the computer translates the item to be printed into a format compatible with the connected printing device, and the printing device outputs a copy of the item on physical media.

BRIEF DESCRIPTION OF THE DRAWINGS

In the accompanying drawings, like numerals refer to like components or blocks. The following detailed description references the drawings, wherein.

DETAILED DESCRIPTION

Figure 1:
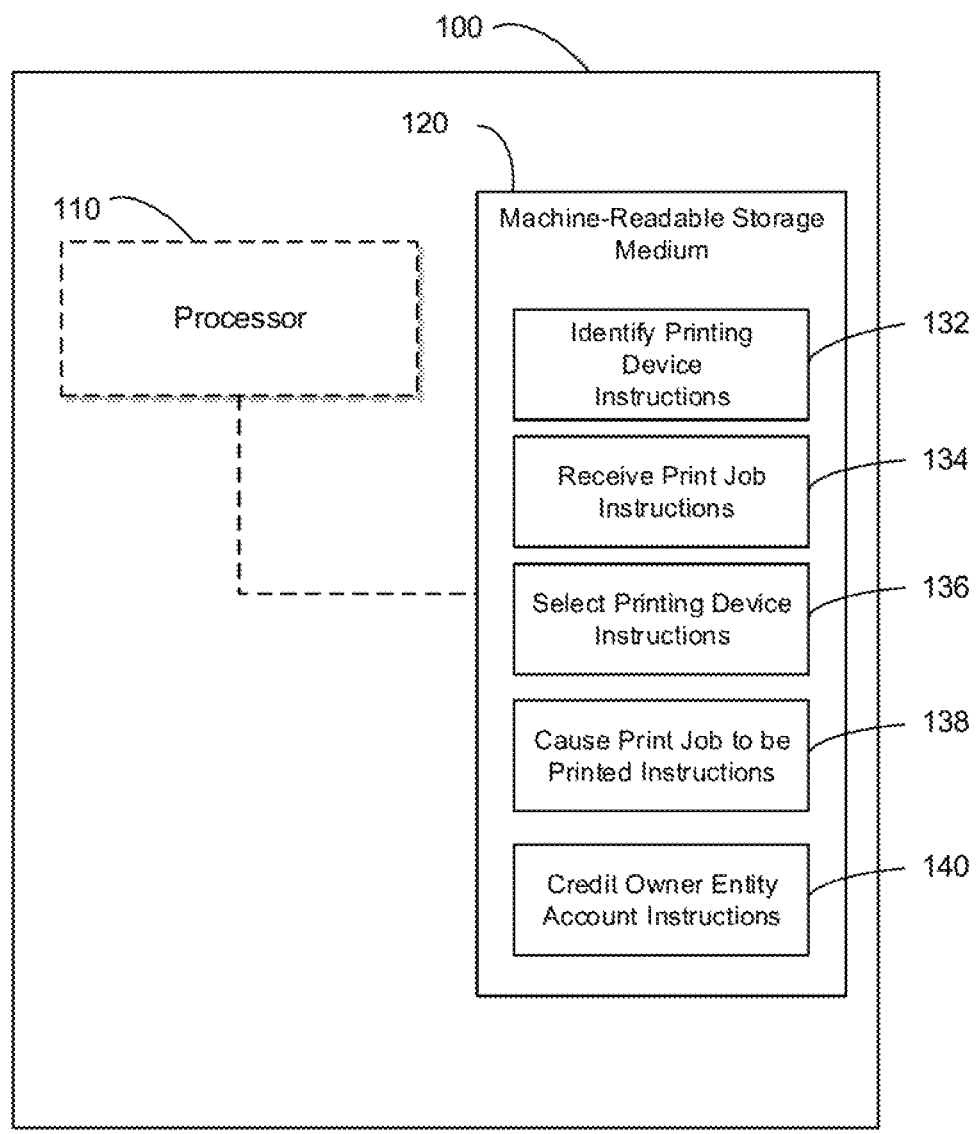
FIG. 1 is a block diagram of an example printing device pool device.

Printer drivers convert data-to-be-printed, such as documents, spreadsheets, etc. to a form specific to a given printer, thus allowing applications to print without being aware of the technical details of each printer model. In some situations, users may not own or have access to a printer of their own, however.

In some situations, consumers and/or businesses may wish to offer and/or utilize printing devices owned by others. For example, a business may have a high speed printer that is frequently sitting idle. Such a printer may be offered for others to use via a matching service to help offset the cost of the device and/or supplies. Such printing devices may comprise, for example, inkjet, laser, and/or additive manufacturing (i.e., 3D printing) devices.

In some implementations, a matching service may allow printer owners to register their printing device(s) for use by users. The owner may provide restrictions on the use (e.g., times, maximum or minimum numbers of pages, types of content, etc.). The matching service may connect to the printer to verify network connectivity and capabilities. Users may register with the matching service to provide their requirements (e.g., print quality, color, duplexing, finishing needs). In some implementations, the matching service may be accessed by a user through an interface similar to a typical application printing command. Such an interface may display options such as a selection of which pages of a document to print, a quality level, a selection of color or black and white, duplex and finishing options, etc.

Upon receiving a document and associated requirements from a user, the matching service may search for an available registered printing device. Criteria for the search may comprise, for example, satisfaction of the user's requirements, proximity to the user, cost of printing the document, turnaround time, etc. The user may be presented with a list of information about available printers, which may include information such as location and cost. The user may then select their preferred printer, and the document details may be sent to that printer for production. Costs for the print job may be charged to the user at any time, such as submission of the document for matching to a printer, delivery of the document to the printer, production of the document, and/or pickup of the finished document. In some implementations, the user may also be charged a recurring subscription fee. Similarly, the printer owner may be credited for producing the document as a recurring subscription payment and/or on a per document basis. Such a per document credit may be provided at any time, such as upon receipt, production, and/or delivery of the document.

Prices may be set by the printer owner to cover the costs of supplies (e.g., paper, ink, toner, staples, etc.) and may vary according to such requirements such as the number of pages, whether color is requested, finishing and duplexing options, urgency, etc. In some implementations, the matching service may be responsible for establishing regularized prices. In such cases, a printer owner may accept or reject matched printing jobs if the offered credit for completing the job is insufficient.

FIG. 1 is a block diagram of, an example printing device pool device 100 consistent with disclosed implementations. Printing device pool device 100 may comprise a processor 110 and a non-transitory machine-readable storage medium 120. Printing device pool device 100 may comprise a computing device such as a server computer, a desktop computer, a laptop computer, a handheld computing device, a smart phone, a tablet computing device, a mobile phone, a network device (e.g., a switch and/or router), a peripheral device, a printing device, or the like.

Processor 110 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 120. In particular, processor 110 may fetch, decode, and execute a plurality of identify printing device pool instructions 132, receive print job instructions 134, select printing device instructions 136, cause print job to be printed instructions 138, and credit owner entity account instructions 140.

Executable instructions may comprise logic stored in any portion and/or component of machine-readable storage medium 120 and executable by processor 110. The machine-readable storage medium 120 may comprise both volatile and/or nonvolatile memory and data storage components. Volatile components are those that do not retain data values upon loss of power. Nonvolatile components, are those that retain data upon a loss of power.

The machine-readable storage medium 120 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Identify printing device pool instructions 132 may identify a pool of printing devices, wherein each of the printing devices is associated with one of a plurality of owner entities. For example, printing device owners, who may represent individuals, organizations, households, businesses, etc. may connect the printing device to a matching service. The matching service may be provided as a cloud-based and/or local network service (e.g., on a building's internal network). The matching service may receive, identify, and/or verify the capabilities of each subscribed printing device. Other characteristics may be configured for each printing device, such as availability times, minimum and/or maximum print job sizes, minimum fee to access, etc. Other characteristics for each printing device in the printing pool may comprise a registered user account associated with the owner entity. The user account may, for example, tie into a bank account, credit card, and/or other payment method.

Receive print job instructions 134 may receive a print job from a user. For example, a user may initiate a printing of a document using an application's normal print command as may be selected by a command keystroke and/or menu selection. The document may be submitted to the matching service for extraction of characteristics such as page count, fonts, number and/or size of images, color or black and white, quality, etc. The submitted print job may further comprise information about the user's matching service account, location, and needed timeframe.

Select printing device instructions 36 may select a printing device from the pool of printing devices for the print job. In some implementations, select printing device instructions 136 may select the printing device according to a capability, location, access cost, and/or an availability of the printing device. The user may be automatically matched with a printing device, such as the nearest printing device and/or the printing device that can complete the job fastest. In some implementations, the user may be presented with a list of available printing devices from the printing device pool. The list may display, for example, location, capabilities, time availability, and/or cost for completion of the print job on the printing device. The user may then manually select one of the listed printing devices.

Cause print job to be printed instructions 138 may cause the print job to be printed by the selected printing device. For example, once the printing device has been selected, the matching service may provide the print job, such as a document, to the printing device with instructions to print the print job. The print job may be printed and/or added to a print queue for the print device immediately, printed at a time set by the user, and/or set up to be printed on demand, such as when the user arrives at the printing device.

Credit owner entity account instructions 140 may credit an account of the owner entity associated with the selected printing device. In some implementations, credit owner entity account instructions 140 may further comprise instructions to debit an account of the user for a cost of causing the print job to be printed by the selected printing device. The instructions to debit the account of the user may, for example, comprise instructions to debit the account of the user after receipt of the printed print job by the user and/or after printing of the print job by the selected printing device. In some implementations, the user may be debited an amount to credit the owner entity as well as a service fee to be paid to the matching service.

Figure 2:
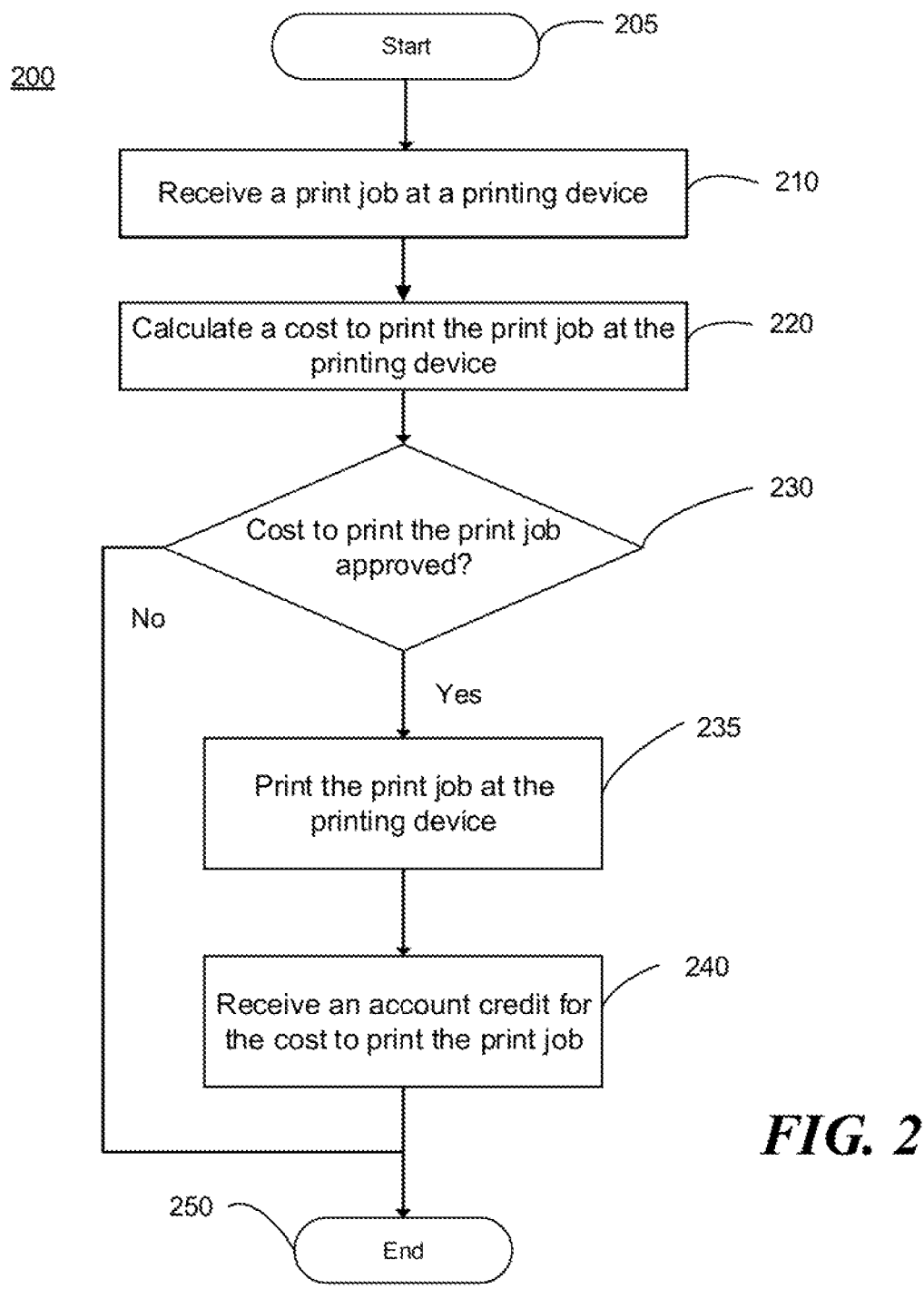
FIG. 2 is a flowchart of an example of a method for providing a printing device pool.

FIG. 2 is a flowchart of an example method 200 for providing a printing device pool consistent with disclosed implementations. Although execution of method 200 is described below with reference to device 100, other suitable components for execution of method 200 may be used.

Method 200 may begin in stage 205 and proceed to stage 210 where device 100 may receive a print job at a printing device. For example, receive print job instructions 134 may receive a print job from a user. For example, a user may initiate a printing of a document using an application's normal print command as may be selected by a command keystroke and/or menu selection. The document may be submitted to the matching service for extraction of characteristics such as page count, fonts, number and/or size of images, color or black and white, quality, etc. The submitted print job may further comprise information about the user's matching service account, location, and needed timeframe.

In some implementations, receiving the print job at the printing device may comprise receiving a plurality of characteristics associated with, the print job. For example, the characteristics may include fonts, number and size of images, black and white or color requirements, number of pages, amount of text, etc. Receiving the characteristics may allow device 100 to calculate a cost of the job at stage 220, below, without receiving the actual data of the print job. This may aid in protecting the user's private data until they agree to submit the print job to the device.

Method 200 may then advance to stage 220 where device 100 may calculate a cost to print the print job at the printing device. The calculated cost may be based on, for example, a size of the print job, a type of the print job, an urgency of the print job, a security requirement of the print job, a location of the printing device, and a content of the print job. In some implementations, the calculated cost to print the print job may be submitted as a bid to print the print job to the user. The user may receive several bids and select a printing device that suits their needs (e.g., cost, turnaround time, proximity, etc.).

Method 200 may then advance to stage 230 where device 100 may determine whether the cost to print the print job has been approved by a user associated with the print job, wherein the user is not affiliated with the printing device. For example, a user associated with the print job may be automatically matched with a printing device, such as the nearest printing device and/or the printing device that can complete the job fastest. In some implementations, the user may be presented with a list of available printing devices from the printing device pool. The list may display, for example, location, capabilities, time availability, and/or cost for completion of the print job on the printing device. The user may then manually select one of the listed printing devices.

In response to determining that the cost to print the print job has been approved by the user associated with the print job, method 200 may advance to stage 235 where device 100 may print the print job at the printing device. In implementations where only print job characteristics have been received, as described above with respect to stage 210, the print device may receive all data to be printed for the print job at the printings device in order to print the print job.

Method 200 may then advance to stage 240 where device 100 may receive an account credit for the cost to print the print job. In some implementations, the account credit for the cost to print the print job may comprise an amount paid by the user less a service fee.

Figure 3:
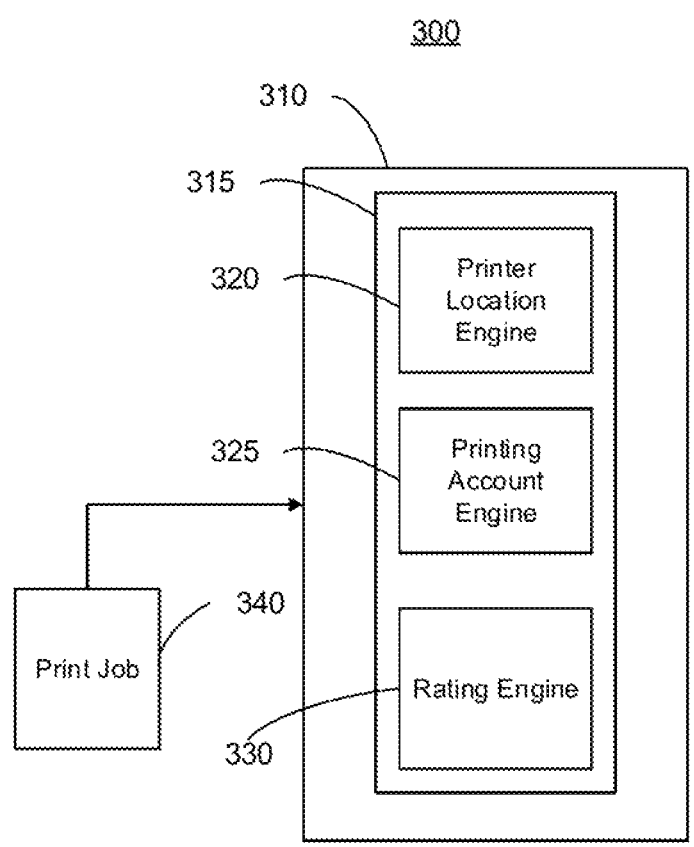
FIG. 3 is a block diagram of an example system for providing a printing device pool.

FIG. 3 is a block diagram of an example system 300 for providing a printing device pool. System 300 may comprise a computing device 310 comprising a memory 315, a printer location engine 320, a printing account engine 325, and a rating engine 330. Engines 320, 325, and 330 may be associated with a single computing device 310 and/or may be communicatively coupled among different devices such as via a direct connection, bus, or network. Each of engines 320, 330 may comprise hardware and/or software associated with computing devices. In some implementations, computing device 310 may also comprise a communicatively coupled printing device.

Printer location engine 320 may identify a plurality of available printers for a print job 340 and route the print job 340 to a selected printer of the plurality of available printers. For example, identify printing device pool instructions 132 may identify a pool of printing devices, wherein each of the printing devices is associated with one of a plurality of owner entities. For example, printing device owners, who may represent individuals, organizations, households, businesses, etc. may connect the printing device to a matching service. The matching service may be provided as a cloud-based and/or local network service (e.g., on a building's internal network). The matching service may receive, identify, and/or verify the capabilities of each subscribed printing device. Other characteristics may be configured for each printing device, such as availability times, minimum and/or maximum print job sizes, minimum fee to access, etc. Other characteristics for each printing device in the printing pool may comprise a registered user account associated with the owner entity. The user account may, for example, tie into a bank account, credit card, and/or other payment method.

Printing account engine 325 may debit a user account of a user associated with the print job 340 and credit, an owner account of an owner associated with the selected printer. For example, credit owner entity account instructions 140 may credit an account of the owner entity associated with the selected printing device. In some implementations, credit owner entity account instructions 140 may further comprise instructions to debit an account of the user for a cost of causing the print job to be printed by the selected printing device. The instructions to debit the account of the user may, for example, comprise instructions to debit the account of the user after receipt of the printed print job by the user and/or after printing of the print job by the selected printing device. In some implementations, the user may be debited an amount to credit the owner entity as well as a service fee to be paid to the matching service.

Rating engine 330 may receive, from the owner associated with the selected printer, a rating for the user associated with the print job 340 and receive, from the user associated with the print job 340, a rating associated with the owner associated with the selected printer. In some implementations, the ratings associated with the user(s) and/or owner(s) may be used by the matching service. For example, a user with a higher rating may receive a discount and/or higher priority for printing. An owner with a higher rating may, for example, receive higher placement in a selection list presented to a user and/or may receive a higher priority during automatic matching.

The disclosed examples may include systems, devices, computer-readable storage media, and methods for printing device pool. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

I claim:

1. A non-transitory machine-readable storage medium for a printing pool device comprising instructions to:
   identify by the printing pool device a pool of printing devices, wherein each of the printing devices is associated with one of a plurality of owner entities and where at least two of the owner entities are different from each other and from a user of the printing pool device;
   receive a print job from the user;
   select a printing device from the pool of printing devices for the print job;
   cause the print job to be printed by the selected printing device; and
   credit an account of the owner entity associated with the selected printing device.

2. The non-transitory machine-readable medium of claim 1, wherein selecting the printing device from the pool of printing devices comprises selecting the printing device according to a capability of the printing device.

3. The non-transitory machine-readable medium of claim 1, wherein selecting the printing device from the pool of printing devices comprises selecting the printing device according to a location of the printing device.

4. The non-transitory machine-readable medium of claim 1, wherein selecting the printing device from the pool of printing devices comprises selecting the printing device according to an access cost of the printing device.

5. The non-transitory machine-readable medium of claim 1, wherein selecting the printing device from the pool of printing devices comprises selecting the printing device according to an availability of the printing device.

6. The non-transitory machine-readable medium of claim 1, wherein the instructions to credit the account of the owner entity associated with the printing device further comprises instructions to debit an account of the user for a cost of causing the print job to be printed by the selected printing device.

7. The non-transitory machine-readable medium of claim 6, wherein the instructions to debit the account of the user further comprises instructions to debit the account of the user for a cost of causing the print job to be printed by the selected printing device after receipt of the printed print job by the user.

8. The non-transitory machine-readable medium of claim 6, wherein the instructions to debit the account of the user further comprises instructions to debit the account of the user for a cost of causing the print job to be printed by the selected printing device after printing of the print job by the selected printing device.

9. A computer-implemented method, comprising:

receiving, at a matching service, a print job from a user;

calculating, at the matching service, a cost to print the print job at a printing device owned by a printer owner and not affiliated with the user, wherein the cost is determined at least in part by a rating of the user that is received at the matching service from the printer owner;

determining, at the matching service, whether the cost to print the print job has been approved by the user; and in response to determining that the cost to print the print job has been approved by the user:

printing the print job at the printing device, and receiving an account credit for the cost to print the print job.

10. The computer-implemented method of claim 9, wherein the account credit for the cost to print the print job comprises an amount paid by the user less a service fee.

11. The computer-implemented method of claim 9, wherein the cost to print the print job is based on at least one of a size of the print job, a type of the print job, an urgency of the print job, a security requirement of the print job, a location of the printing device, and a content of the print job.

12. The computer-implemented method of claim 9, wherein receiving the print job at the printing device comprises receiving a plurality of characteristics associated with the print job.

13. The computer-implemented method of claim 12, further comprising, in response to determining that the cost to print the print job has been approved by the user associated with the print job, receiving all data to be printed for the print job at the printing device.

14. The computer-implemented method of claim 11, wherein calculating the cost to print the print job comprises submitting a bid to print the print job to the user.

15. The method of claim 9, wherein the printing device is selected from a pool of printing devices, wherein each of the printing devices is associated with one of a plurality of owner entities where at least two of the owner entities are different from each other.

16. A system, comprising:

a printer location engine to:

identify a plurality of available printers for a print job, and route the print job to a selected printer of the plurality of available printers;

a printing account engine to:

debit a user account of a user associated with the print job, and credit an owner account of an owner associated with the selected printer; and a rating engine to:

receive, from the owner associated with the selected printer, a rating for the user associated with the print job, and receive, from the user associated with the print job, a rating associated with the owner associated with the selected printer.

17. The system of claim 16, wherein the rating for the user is used by the system to determine at least one of an amount debited from the user account or a priority assigned to the print job of the user.

18. The system of claim 16, wherein the rating for the owner is used by the system to determine a placement in a printer selection listed presented to the user of at least one of the available printers associated with the owner or a priority assigned to at least one of the available printers associated with the owner during automatic selection of the selected printer.

19. The system of claim 16, wherein the owner associated with the selected printer does not own the printer location engine, the printing account engine, and the rating engine.

* * * * *